United States Patent [19]

Ikegami et al.

[11] Patent Number: 4,663,731
[45] Date of Patent: May 5, 1987

[54] WORD PROCESSING SYSTEM FOR INSERTING CHARACTERS INTO A SERIES OF CHARACTERS

[75] Inventors: Yoshiki Ikegami, Inagi; Fumio Matsumoto, Yokohama; Yasuaki Sato, Sagamihara; Yoshio Hayakawa, Kawaguchi, all of Japan

[73] Assignee: Fujitsu Limited, Kawasaki, Japan

[21] Appl. No.: 574,252

[22] Filed: Jan. 26, 1984

[30] Foreign Application Priority Data

Jan. 28, 1983 [JP] Japan .................. 58-013255

[51] Int. Cl.⁴ .................. G06F 3/14; G06F 15/00
[52] U.S. Cl. .................. 364/900; 364/521; 400/63; 340/724
[58] Field of Search ... 364/200 MS File, 900 MS File, 364/518, 521; 340/709, 723, 724; 400/61, 63, 83

[56] References Cited

U.S. PATENT DOCUMENTS 3,505,665  4/1970  Lasoff et al. .................. 340/721 X
4,464,730  8/1984  Lawrence et al. .................. 364/900
4,495,490  1/1985  Hopper et al. .................. 340/709
4,506,342  3/1985  Yamamoto .................. 364/900

FOREIGN PATENT DOCUMENTS 53-78736  7/1978  Japan .................. 340/709

Primary Examiner—Archie E. Williams
Assistant Examiner—Thomas C. Lee
Attorney, Agent, or Firm—Staas & Halsey

[57] ABSTRACT

A word processing system for inserting characters into a series of displayed characters within a predetermined field, including a circuit (1008) for moving a series of characters displayed on and after a cursor position to the end portion of the field by pushing an insertion key indicating the insertion of characters, a circuit (1015) for inserting a character into the cursor position and moving the cursor by pushing a character key, and a circuit (1017) for filling the spaces following the inserted characters with the previously moved series of characters.

6 Claims, 19 Drawing Figures

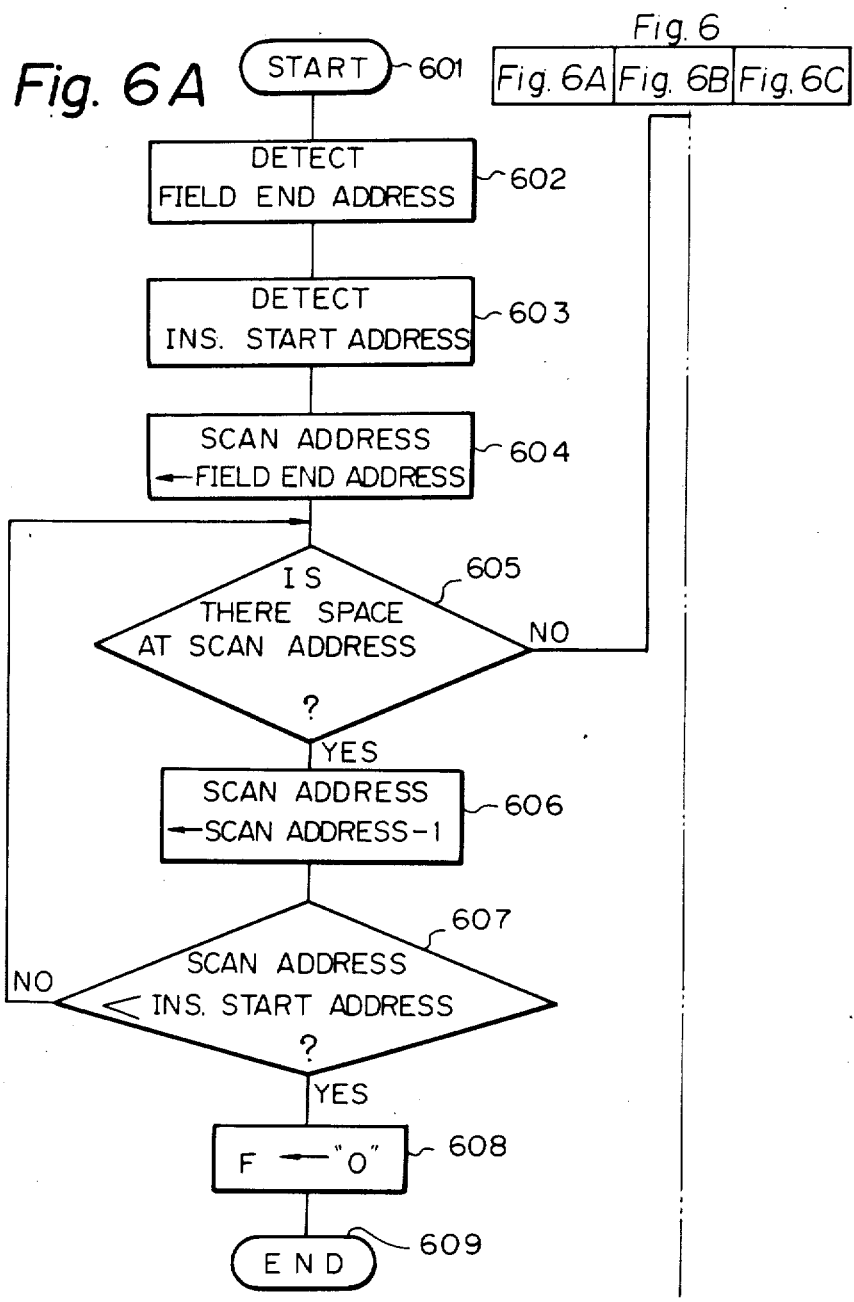

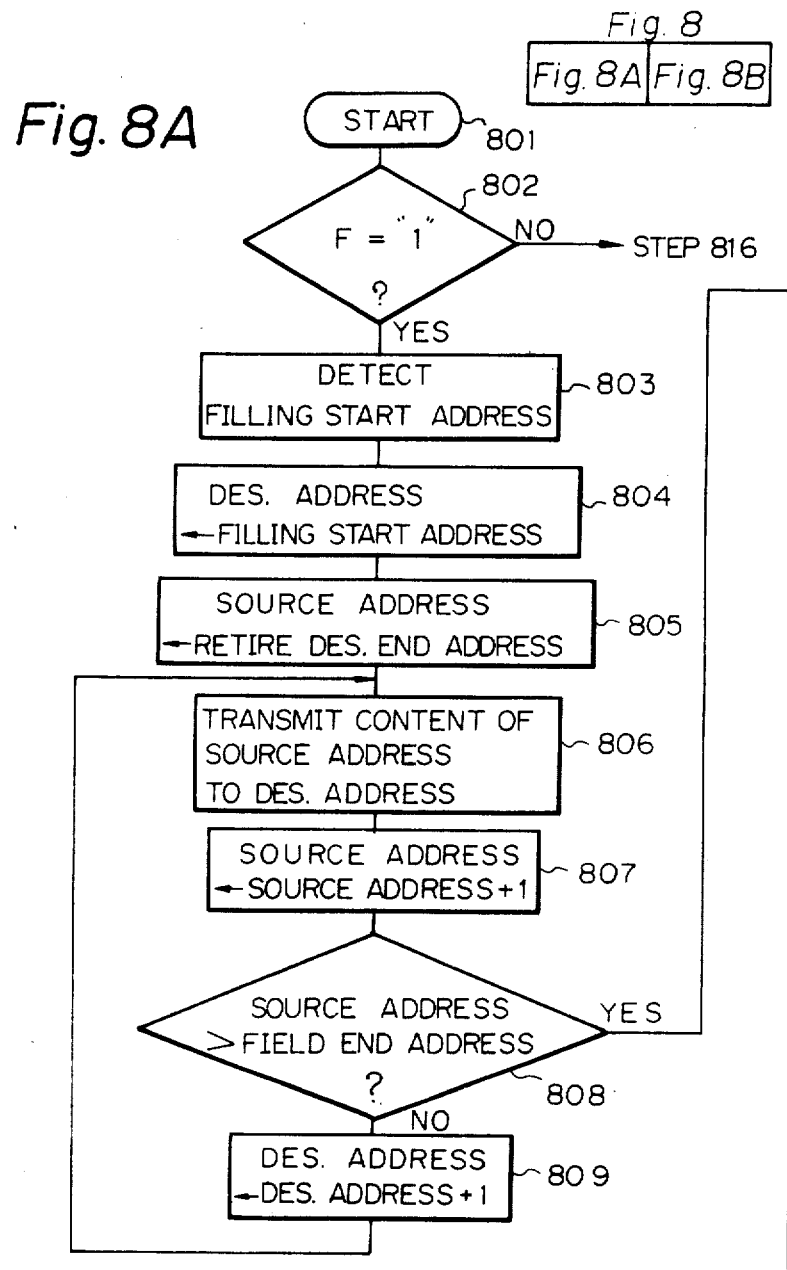

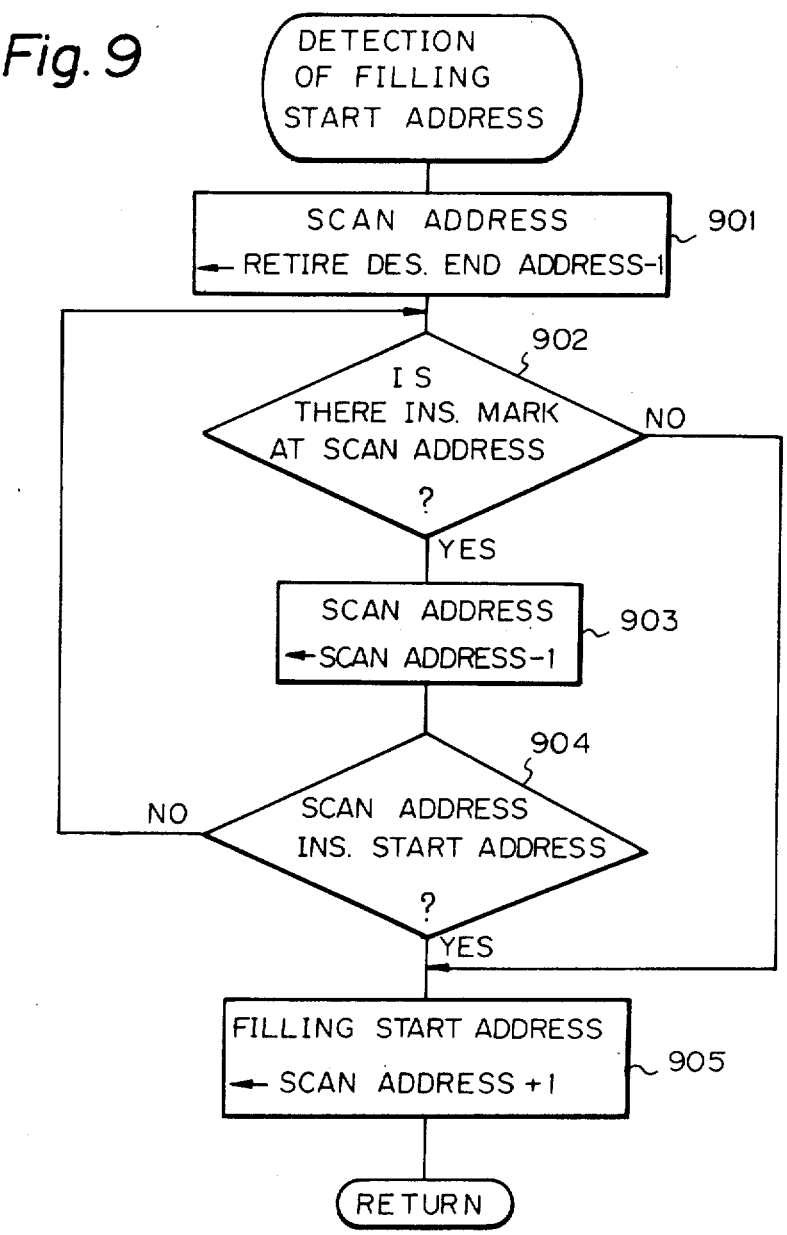

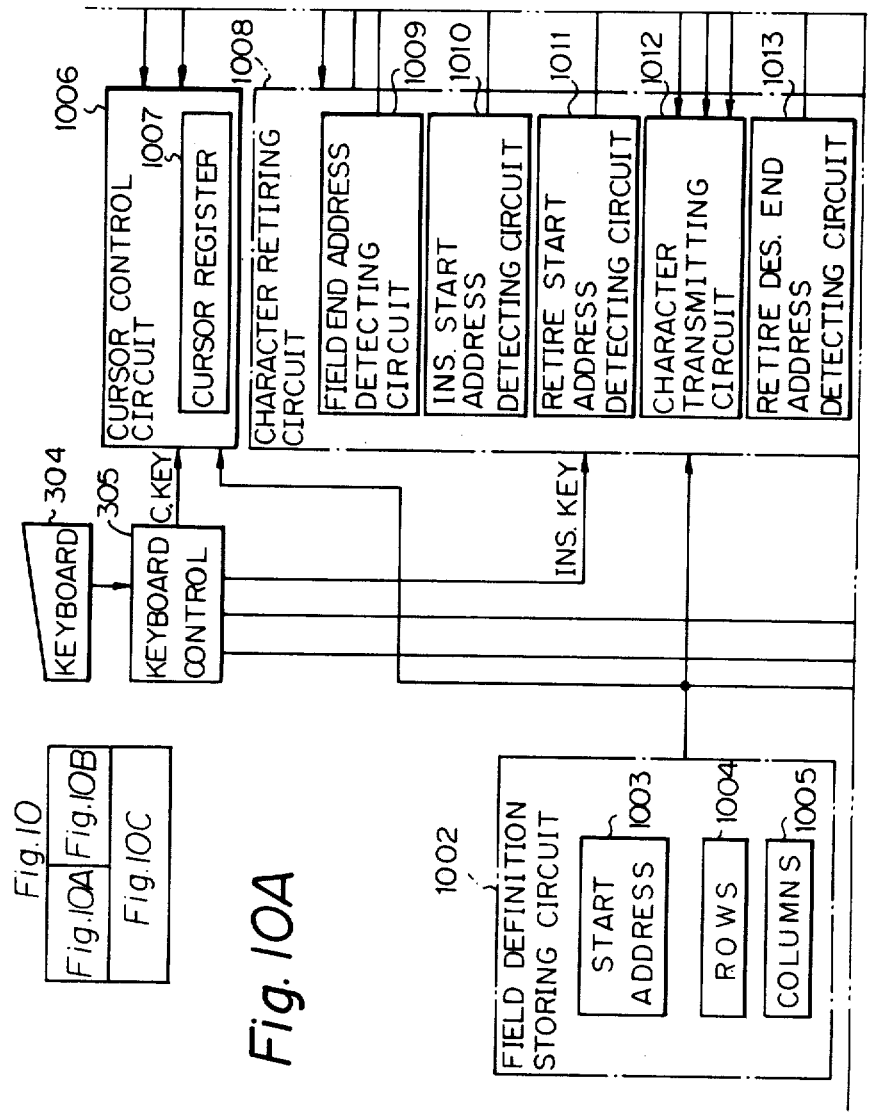

WORD PROCESSING SYSTEM FOR INSERTING CHARACTERS INTO A SERIES OF CHARACTERS

BACKGROUND OF THE INVENTION

1. Field of the Invention

The present invention relates to a word processing system, more particularly, to a word processing system for inserting characters into a series of characters positioned within a predetermined field and displayed on a display unit.

2. Description of the Prior Art

The development of word processing has made possible electronic card systems in which information is stored on card images in a floppy disk or other memory medium, thereby enhancing office efficiency. In such a system, a card image, i.e., a field, is displayed on a display unit and information is added thereon. It should be noted that the area of each field is predetermined by defining the start coordinates, the number of rows, the number of columns, and the like. Accordingly, the number of characters to be written into each field is limited.

In a Japanese language word processing system, "hiragana"-to-"kanji" transformation is carried out, that is, words are typed in by phonetic "hiragana" (symbols in a cursive syllabary) and then, when necessary, transformed into the corresponding ideographic "kanji" characters.

In this Japanese language word processing system, when characters are inserted into a series of displayed characters, the characters displayed after the inserted characters must be shifted forward. In addition, when a "hiragana"-to-"kanji" transformation is performed, the characters displayed after the transformed "hiragana" may have to be shifted backward depending on whether the character length of the "kanji" is shorter than that of the "hiragana".

As a result of continual forward and backward shifting, the characters on the display become difficult to observe.

To keep the displayed characters from being continuously visually shifted in forward and backward, a prior art method is known in which the series of characters displayed on and after a displayed cursor temporarily disappear from the display when a key indicating a character insertion is pushed and then the series is redisplayed and combined with the end of the inserted characters when an execution key is pushed after the completion of character insertion.

When the above-mentioned prior art method is applied to a word processing system using a predetermined field (or card image), however, there is the disadvantage that, after character insertion, some of the characters which are temporarily erased from the display may overflow the available space in the field and accordingly may be inadvertently lost.

SUMMARY OF THE INVENTION

It is an object of the present invention to provide a word processing system for inserting characters into a series of displayed characters within a field, in which the available space in the field can be known, thereby preventing redisplayed characters from overflowing the field and being lost.

According to the present invention, a circuit is provided for retiring or moving a series of characters displayed on and after a cursor position to the end portion of the field by pushing a key indicating that characters are to be inserted. A circuit is also provided for inserting characters into the cursor position and moving the cursor by pushing a character key. Further, a circuit is provided for later filling the space following the inserted characters with the retired series of characters. Therefore, during a character inserting mode, the available space in the field can be known since the space actually corresponds to the space between the series of characters which remaind in place and the retired series of characters within the field.

BRIEF DESCRIPTION OF THE DRAWINGS

The present invention will be more clearly understood from the description as set forth below with reference to the accompanying drawings, wheren:

FIG. 9 is a flowchart of the step 803 in FIG. 8; and

FIGS. 10A-10C conceptually represent software modules in a word processing system according to the present invention.

DESCRIPTION OF THE PREFERRED EMBODIMENTS

First, the principle of the processing mode according to the present invention will be explained with reference to FIGS. 1A through 1D. In FIGS. 1A through 1D, two fields 1 and 2 are defined within a display picture 3. Such fields are predetermined by field definition information, i.e., start coordinates, number of rows, number of columns, and the like. In a writing mode for the field 2, the motion of a cursor 4, for indicating position into which a character can be written, is usually limited by the field 2. Of course, three or more fields can be defined for one display picture. In addition, although information displayed on the display picture is stored in a memory unit, in this case called a "card image buffer", the amount of information stored in the card image buffer is larger than that of the display picture. Therefore, as occasion demands, an up(down)-scrolling operation or a right(left)-scrolling operation is performed upon the display picture.

Figure 1A:
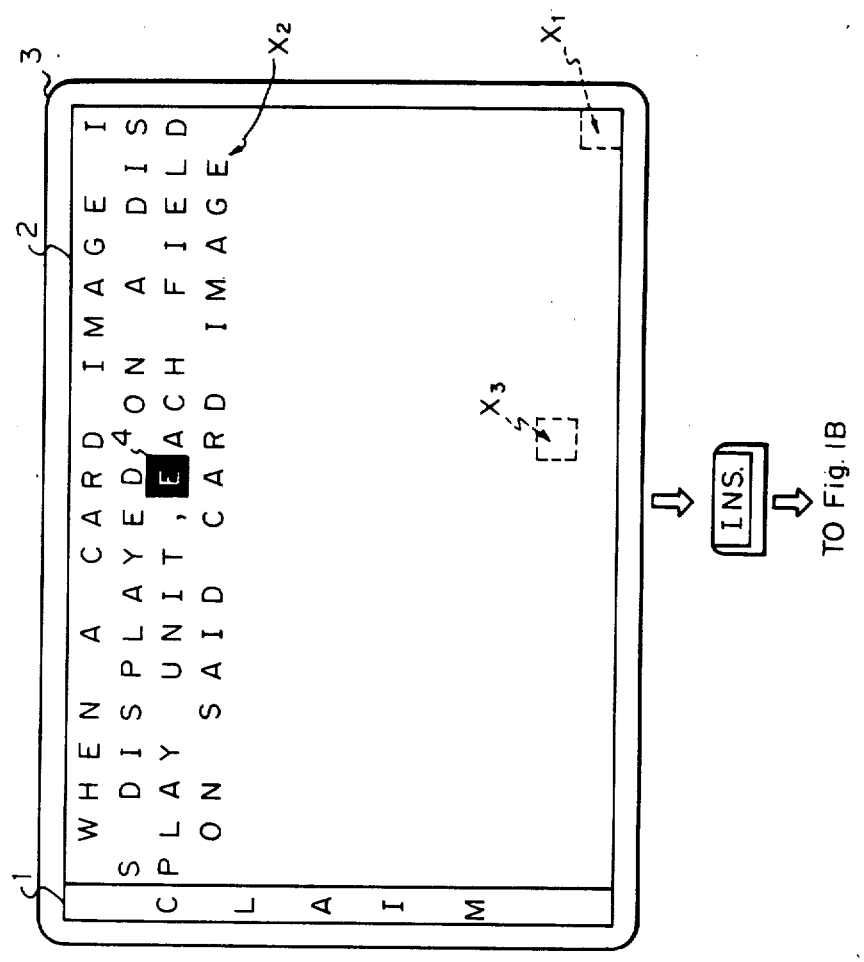
FIGS. 1A through 1D are diagrams of display picture use for explaining a processing mode principle according to the present invention.

In FIG. 1A, assume that certain characters are to be inserted at the position of the cursor 4. For this purpose, an insertion key "INS." is pushed on a keyboard (not shown). As a result, the state of the display picture 3 is changed from FIG. 1A to FIG. 1B.

Figure 1B:
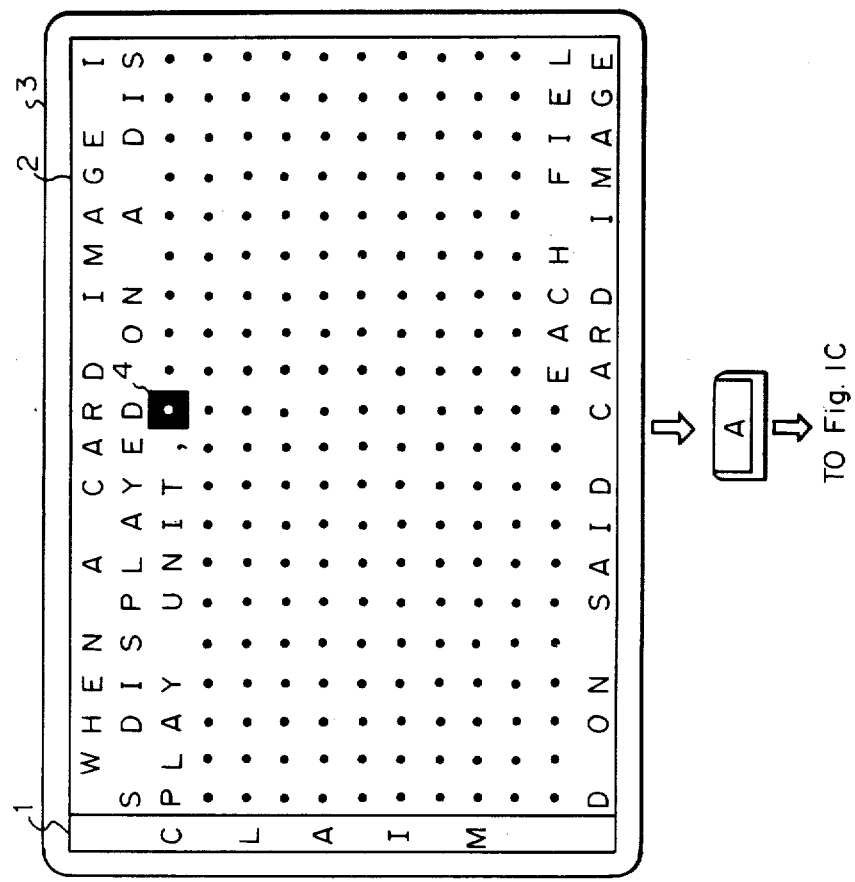

In FIG. 1B, the characters "EACH FIELD ON SAID CARD IMAGE" which displayed on and after the position of the cursor 4 are moved (retired) to the end portion of the field 2. In this case, it is assumed that the entire field 2 is displayed on the display picture 3. Then, and insertion mark such as "." is automatically written into each space from the position of the cursor 4 to a position immediately before the start of the retired characters. Thus, the operator can easily recognize the available space by observing the insertion marks. In this state, when a character key such as "A" is pushed, the corresponding character "A" is written at the position of the cursor 4. After writting of each characters, the cursor 4 is automatically moved to the next position. For example, when the characters "AND IN ADDITION," are written into the space, the state of the display picture 3 is changed from FIG. 1B to FIG. 1C.

In this state, if the inserted characters are "hiragana" in the Japanese language word processing system, a "hiragana"-to-"kanji" transformation can be performed upon the input "hiragana". As a result, the transformed "kanji" can be written into the card image buffer and displayed on the display picture. In this case, however, the length of the transformed "kanji" is usually shorter than that of the "hiragana".

Figure 1C:
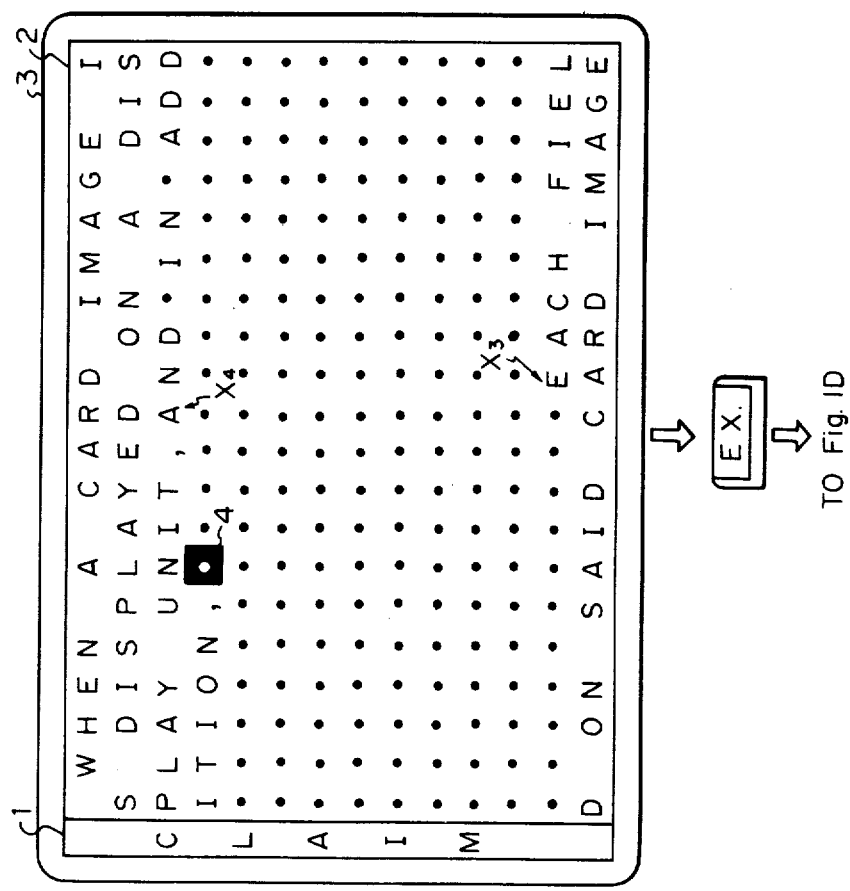
Figure 1D:
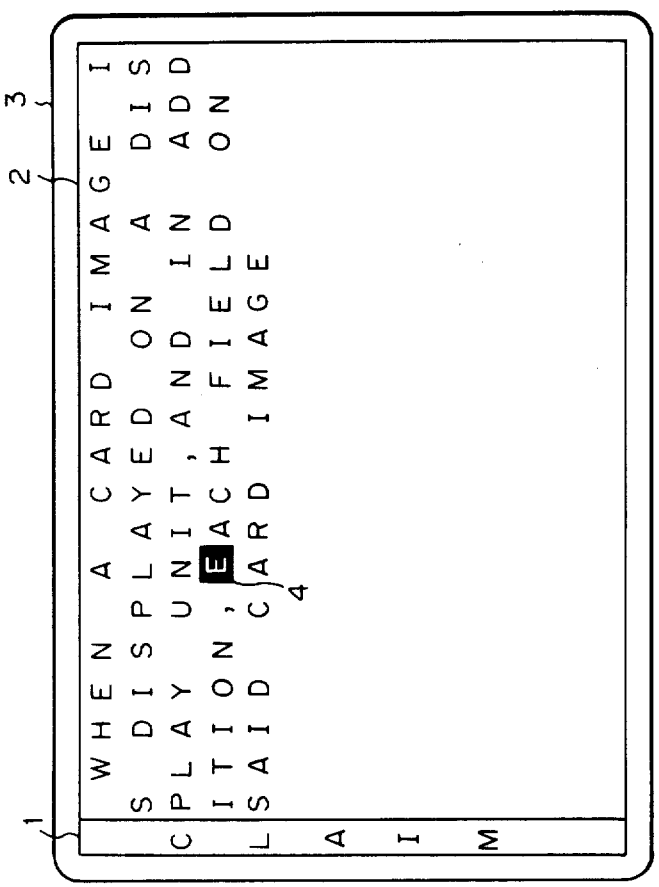

In FIG. 1C, when an execution key "EX." is pushed, the state of the display picture 3 is changed from FIG. 1C to FIG. 1D. That is, the retired series of characters "EACH . . . IMAGE" are redisplayed immediately behind the inserted characters. After that, all the insertion marks are cleared.

In the state illustrated in FIG. 1B, if a cursor key is pushed to move the cursor 4 to a location after some of the insertion marks and then the characters "AND IN ADDITION, " are inserted, the state of the display picture 3 is changed from FIG. 1B to FIG. 2A. In the state illustrated in FIG. 2A, when the execution key is pushed, the state of the display picture 3 is changed to FIG. 2B. In FIG. 2B, the retired series of characters "EACH . . . IMAGE" are also redisplayed immediately benind the inserted characters and then all the insertion marks are cleared. In this case, however, although two space areas are present, the state illustrated in FIG. 2B can be realized without pushing a space key for the spaces following the first comma.

Figure 3:
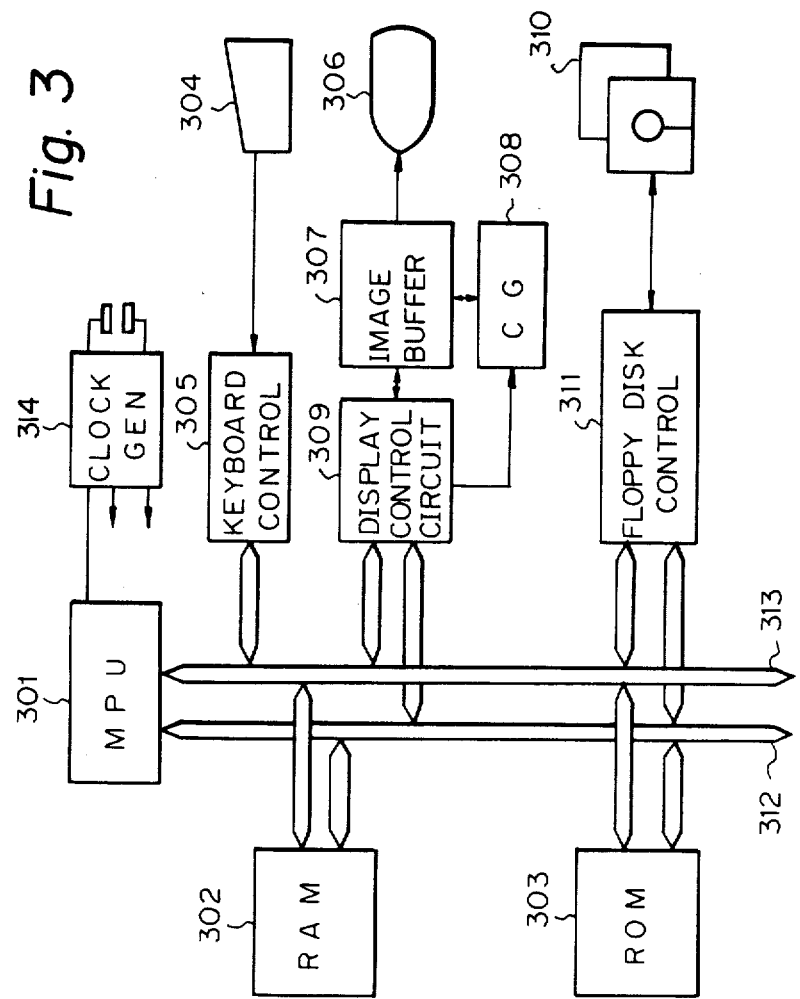
FIG. 3 is a block diagram of an embodiment of a word processing system according to the present invention.

In FIG. 3, which illustrates an embodiment of the word processing system according to the present invention, reference numeral 301 designates a microprocessor unit (MPU); 302 a RAM for storing temperary data; 303 a read-only memory (ROM) for storing programs, constants, and the like; 304 a keyboard; 305 a keyboard control circuit; 306 a display unit (36 rows×48 columns); 307 an image buffer for storing the content of the displayunit 306; 308 a character generator; 309 a display control circuit; 310 floppy disks; 311 a floppy disk control circuit; 312 an address bus; 313 a data bus; and 314 a clock generator for supplying clock signals to the MPU 301 and the like.

Figure 4:
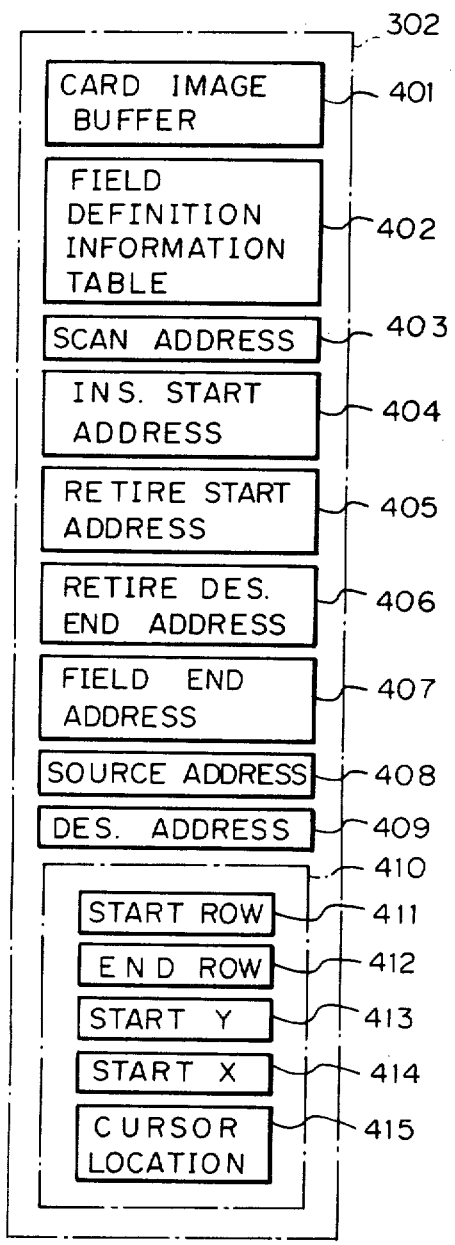
FIG. 4 is a detailed block diagram of random access memory (RAM) of FIG. 3.

In FIG. 4, which is a detailed block diagram of the RAM 302 of FIG. 3, reference numeral 401 designates a card image buffer area (60 rows and 96 columns) for storing information, 402 a field defination information table area for storing the start address (relative coordinates), the number of rows, the number of columns, and the like regarding each field; and 403, 404, 405, 406, 407, 408 and 409 areas for storing a scan address, an insertion start address, a retire start address, a retire destination end address, a field end address, a source address and a destination address of the card image buffer area 401. In addition, since the card image buffer area 401 (60 rows×96 columns) is larger than the image buffer 307 (36 rows×48 columns), which corresponds to the display picture of the display unit 306, only part of the content of the card image buffer area 401 are displayed on the display picture. For this purpose, a display picture control information area 410 is provided.

Figure 5:
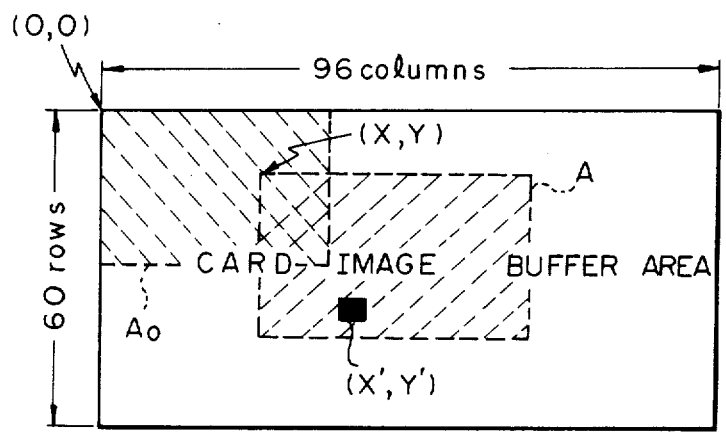
FIG. 5 is an explanatory diagram of a card image buffer area of FIG. 4.

The display picture control information area 410 comprises five areas 411 through 415. The area 411 stores the start row (absolute coordinate) of the display picture which has, for example, 36 rows. The area 412 stores the end row (absolute coordinate) of the display picture. Note that "absolute coordinates" means the coordinates on the display picture. The area 413 stores the Y-coordinate (relative coordinate) of the displayed part of the card image buffer area 401, and the area 414 stores the X-coordinate (relative-coordinate) of the displayed part of the card image buffer area 401. Note that "relative coordinates" means the coordinates in the card image buffer area 401. Such X- and Y-coordinates are indicated in FIG. 5, in which an area A designates the displayed part of the card image buffer area 401. The area 415 stores a cursor location, i.e., the relative coordinates X' and Y' of a cursor on the card image buffer area 401. These relative coordinates of the cursor location are transformed into the absolute coordinates of the display picture in which the cursor is located. For example, when the MPU 301 writes "0" into both the start Y- and X-areas 413 and 414, the initial area of the card image buffer area 410 as indicated by $A_0$ in FIG. 5 will be displayed.

Figure 6B:
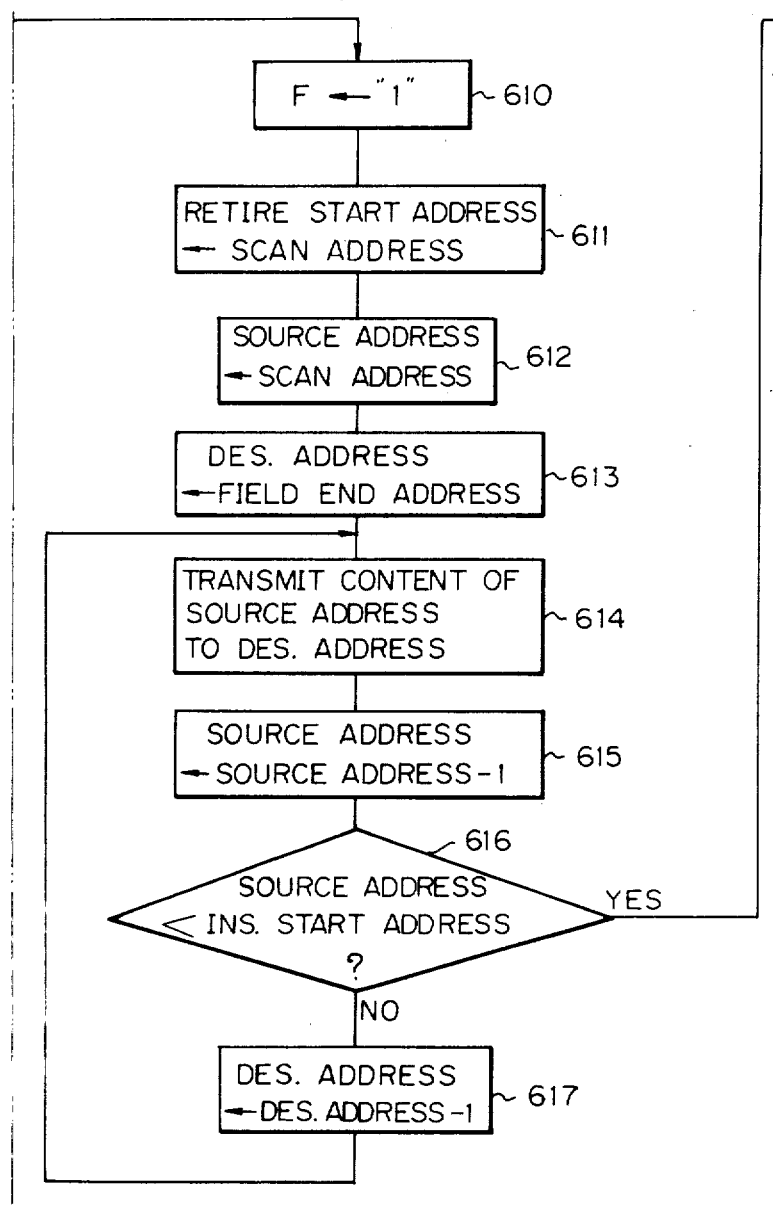
Figure 6C:
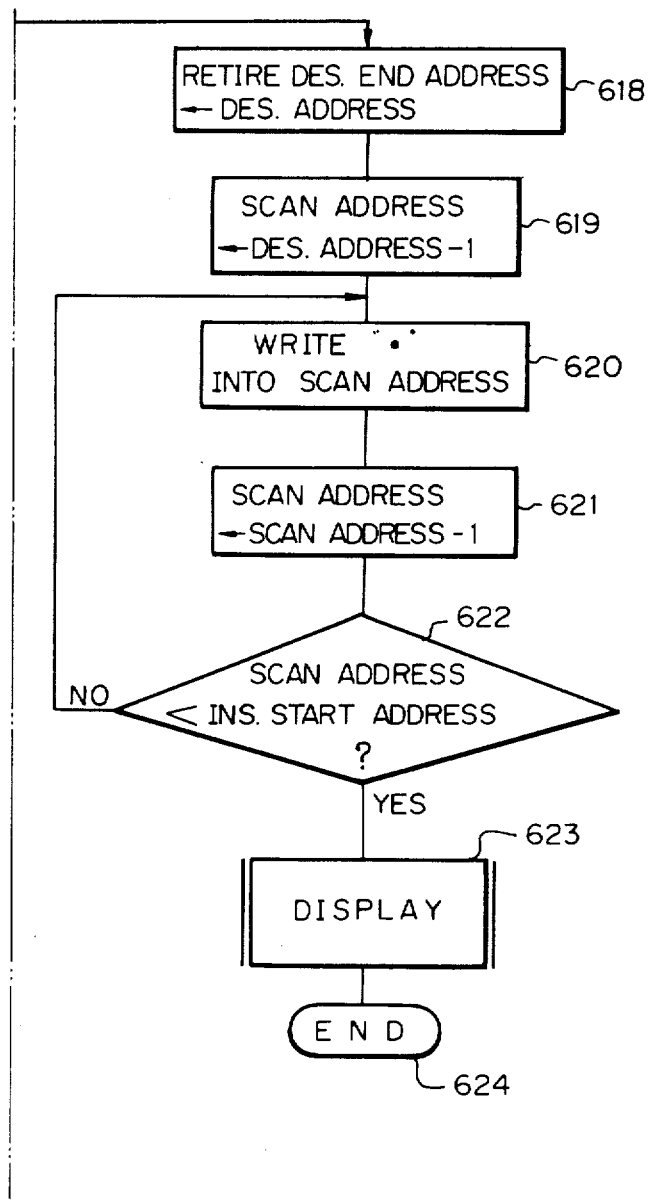

The operation of the word processing system of FIG. 3 will now be explained with reference to FIGS. 6, 7 and 8.

First, assume that the display unit 306 shows the display picture 3 illustrated in FIG. 1A. In FIG. 6, step 601 is started by pushing the insertion key "INS." (see FIG. 1A) on the keyboard 304. Then, control is transferred to step 602 in which the MPU 301 detects the field end address of the field 2 by calculation based on the following formula using the information stored in the field definition information table 402:

Field end address=start address (corresponding to the start coordinates of the field)+rows×columns−1.

Then, the MPU 301 stores the detected field end address in the field end address area 407. Note, in this case, that the field end address corresponds to the position indicated by $X_1$ in FIG. 1A.

At a step 603, the MPU 301 detects an insertion start address. The insertion start address is, in this case, defined by the location of the cursor 4. Therefore, the MPU 301 writes the content of the cursor location area 415 into the insertion start address area 404.

At step 604, the MPU 301 writes the content of the field end address area 407 into the scan address area 403. Then, at step 605, the MPU 301 determines whether or not there is a space at the scan address of the card image buffer area 401. If there is, control is transferred to step 606, in which the content of the scan address area 403 is decreased by +1. Then, at step 607, the MPU 301 determines whether or not the scan address is smaller than the insertion start address. If the scan address is smaller than the insertion start address, this means that there are no characters at or after the insertion start address, so that no insertion process is necessary. Therefore, at step 608, a flag F is cleared and, at step 609, the routine of FIG. 6 is completed. The flag F indicates if an insertion process is necessary.

However, if the determination at step 607 is negative, control returns to step 605. If the determination at step 605 is negative, this means that there are one or more characters on or after the insertion start address, so that an insertion process is necessary. Therefore, control is transferred to step 610 in which the flag F is set at "1". At step 611, the MPU 301 writes the content of the scan address area 403 into the retire start address area 405. In this case, the retire start address corresponds to the location indicated by $X_2$ in FIG. 1A.

Next, the characters "EACH ... IMAGE" located at the insertion start address (i.e., the cursor 4) through the retire start address ($X_2$) are transmitted to the locations $X_3$ through $X_1$. This transmission is carried out by the steps 612 through 617. That is, at step 612, the MPU 301 writes the content of the scan address area 403 into the source address area 408 and, at step 613, the MPU 301 writes the content of the field end address area 407 into the destination address area 409. Then, at step 614, the MPU 301 transmits the content at the source address of the card image buffer area 401 to the destination address thereof. Then, at step 615, the content of the source address area 408 is decreased by 1 and, at step 616, the MPU 301 determines whether or not the source address is smaller than the insertion start address, i.e., the retire process is completed. If completed control is transferred to step 618. If not completed, control is transferred to step 617, in which the content of the destination address area 409 is also decreased by 1, and control returns to step 614.

After the retire process is completed, at step 618, the MPU 301 writes the content of the destination address area 409 into the retire destination end address area 406. In this case, as stated above, the retire destination end address corresponds to the location indicated by $X_3$ in FIG. 1A.

Insertion marks "." are written into spaces by the steps 619 through 622. That is, at step 619, the MPU 301 decreases the content of the destination address area 409 by 1 and writes it into the scan address area 403. Then, at step 620, the MPU 301 writes "." into the scan address of the card image buffer area 401. At step 621, the MPU 301 decreases the content of the scan address area 403 and, at step 622, the MPU 301 determines whether or not the scan address is smaller than the insertion start address. If not smaller, control returns to step 620. If smaller, the process of inserting marks "." is completed so that control is transferred to step 623, in which the MPU 301 displays the content of field 2 of the card image buffer area 401 as illustrated in FIG. 1B. Then, the routine of FIG. 6 is completed by step 624.

Figure 7:
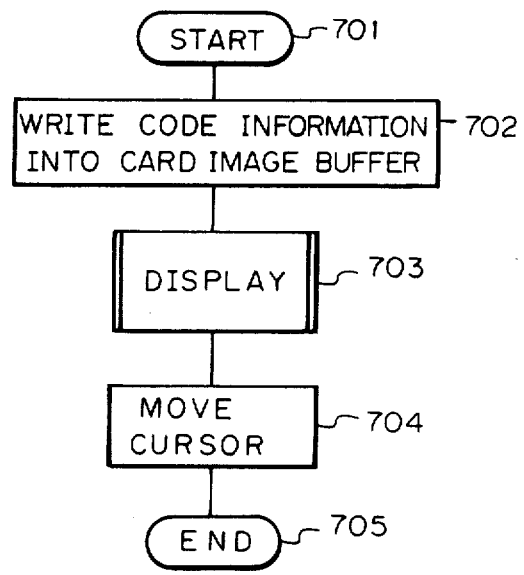
FIGS. 6, 7, and 8 are flowcharts of the operation of the sytem of FIG. 3.

In the state illustrated in FIG. 1B, when a character key on the keyboard 304 is pushed, the step 701 of the routine illustrated in FIG. 7 is started. At step 702, the MPU 301 writes the code information corresponding to the pushed character key into the location of the card image buffer area 401 indicated by the cursor 4 and displays the character on the display picture. Then, at step 704, the MPU 301 moves the cursor 4 to the next location. In the usual write mode for characters, the cursor 4 is moved to the right within the display picture in every character writing operation. When the cursor reaches the boundary on the right side of the displayed field, the cursor is moved to the first location of the next row of the field. Then, the routine of FIG. 7 is completed by step 705. Note that the routine of FIG. 7 is carried out each time a character key is pushed.

Figure 2A:
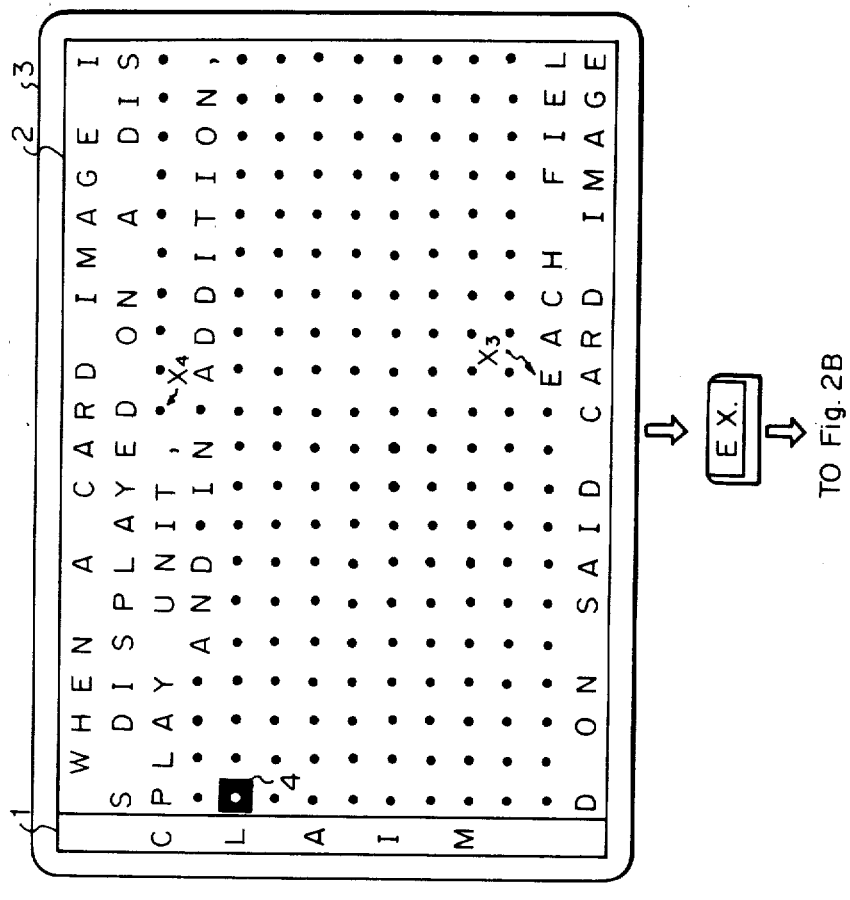
FIGS. 2A and 2B are modifications of FIGS. 1C and 1D, respectively.

Therefore, when the character keys "A", "N" and "D", the cursor key, the character keys "I" and "N", the cursor key and the character keys "A" "D", "D", "I", "T", "I", "O", "N" and ", " are pushed in this order, the state of the display picture illustrated in FIG. 1C is obtained. On the other hand, when the keys in the above-mentioned order are pushed after the cursor key is pushed 14 times, the state of the display picture illusted in FIG. 2A is obtained.

Figure 8B:
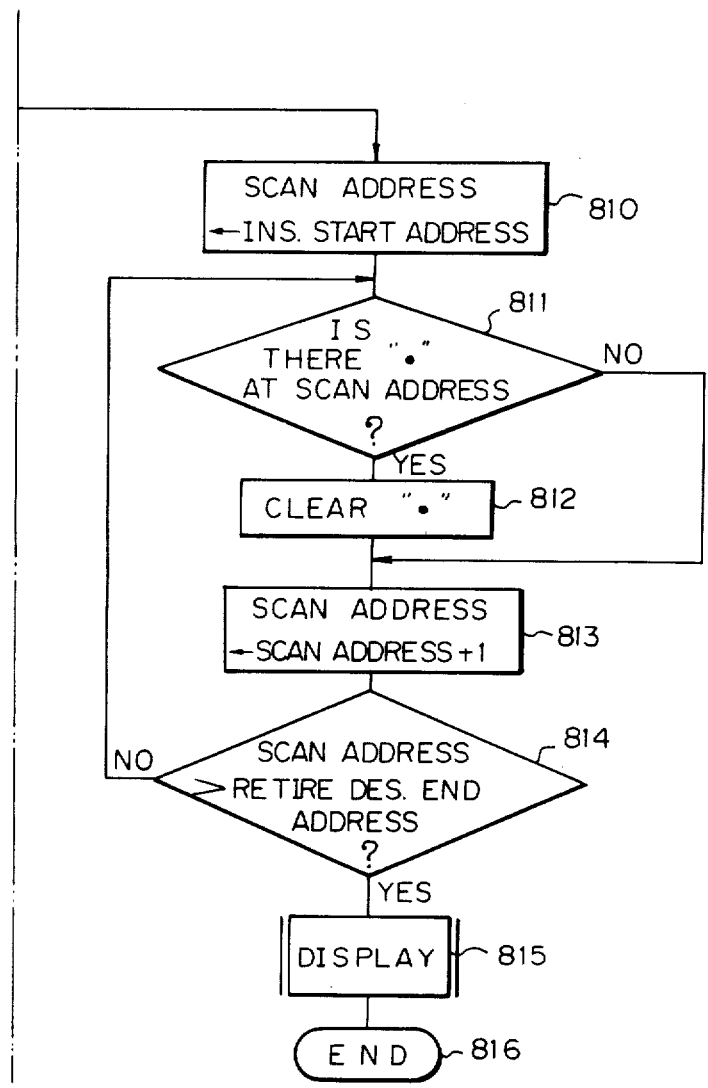

Next, when the execution key "EX." is pushed, the step 801 of the routine of FIG. 8 is started. This routine is provided for filling the spaces behind the inserted characters with the retired series of characters "EACH ... IMAGE". At step 802, the MPU 301 determines whether or not the flag F is "1". If the flag F is "0", no retiring process was carried out, so control is transferred directly the end step 816. Contrary to this, if the flag F is "1", control is transferred to step 803. At step 803, the MPU 301 detects a filling start address. In this case, the filling start address corresponds to the address of the cursor 4 in FIG. 1C or 2A. However, the cursor 4 is usually located at a random position and therefore, the step 803 of FIG. 8 is carried out by the routine illustrated in FIG. 9.

In FIG. 9, at step 901, the MPU 301 decreases the content of the retire destination end area 406 by 1 and writes it into the scan address area 403. Then, at step 902, the MPU 301 determines whether or not there is an insertion mark at the scan address. If there is, control is transferred to step 903 in which the MPU 301 decreases the content of the scan address area 403 by 1 and at step 904, the MPU 301 determines whether or not the scan address is smaller than the insertion start address. If not smaller, control returns to step 902. If the determination at step 902 is negative, or if the determination at step 904 is affirmative, control is transferred to step 905 in which the MPU 301 increases the content of the scan address area 403 by +1, thereby detecting the filling start address.

Returning to FIG. 8, at step 804, the MPU 301 writes the filling start address, in this case the address of the cursor 4, into the destination address area 409.

Then, at step 805, the MPU 301 writes the retire destination end address ($X_3$ in FIG. 1C or 2A) into the soure address area 408. Then, at step 806, the MPU 301 transmits the content at the source address of the card image buffer area 401 to the destination address thereof, then clears the content at the source address. At step 807, the content of the source address area 408 is increased by +1, and at step 808, the MPU 301 determines whether or not the source address is larger than the field end address, i.e., the filling process is ended. If ended, control is transferred to step 810. If not ended, control is transferred to step 809, in which the content of the destination address area 409 is also increased by +1, and control to step 806.

Figure 2B:
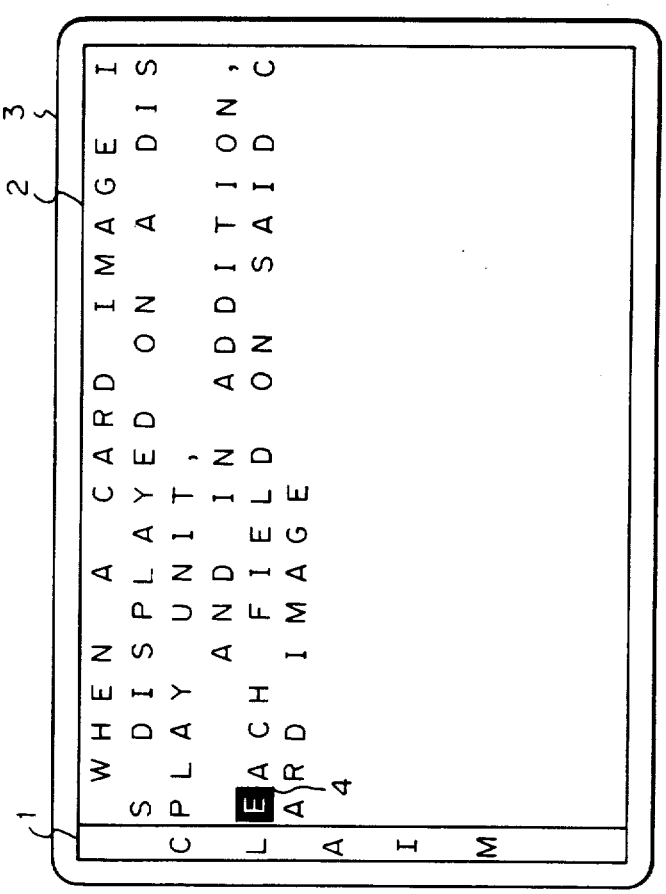

After the filling process is completed, at step 810, the MPU 301 writes the content of the insertion start address area 404 ($X_4$ in FIG. 1C or 2A) into the scan address area 403. At step 811, the MPU determines whether or not there is an insertion mark "." at the scan address of the card image buffer area 401. If there is, control is transferred directly to step 812 in which the MPU 301 clears the insertion mark. If the determination at step 811 is negative, control is transferred directly to step 813. AT step 813, the MPU 301 increases the content of the scan address area 403, and at step 814, the MPU 301 determines whether or not the scan address is larger than the retire destination end address ($X_3$ in FIG. 1C or 2A). If not larger, control returns to step 811. If larger, a clearing process for marks "." is completed so that control is transferred to step 815, in which the MPU 301 displays the content of field 2 of the card image buffer area 401 as illustrated in FIG. 1D or 2B. Then, the routine of FIG. 8 is completed by step 816.

Figure 10B:
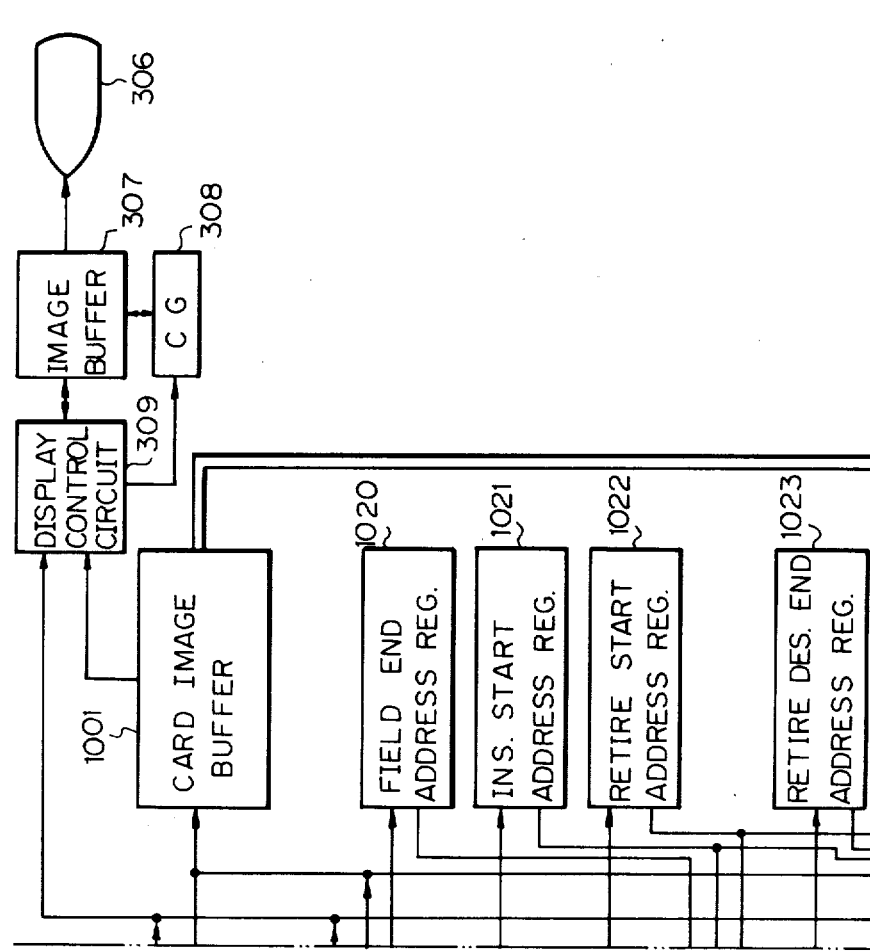
Figure 10C:
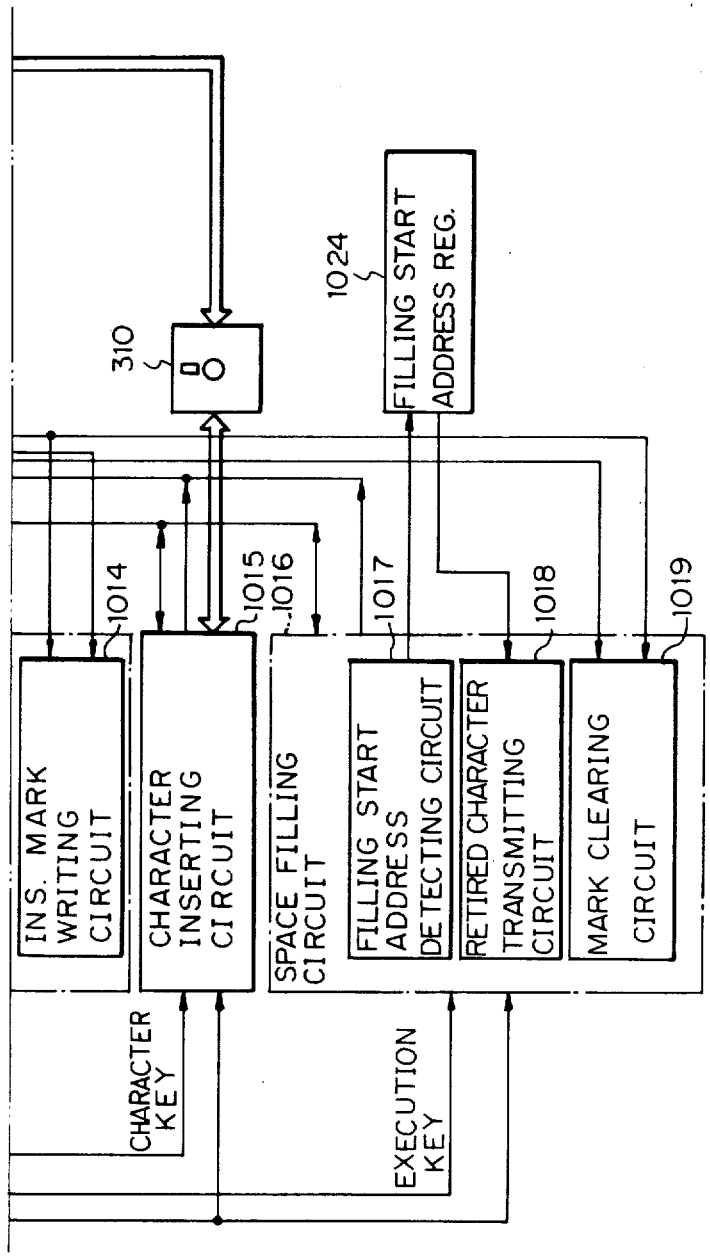

In FIG. 10, which illustrates another embodiment of the word processing system according to the present invention, the elements 304 through 310 are the same as those of FIG. 3. A card image buffer 1001 corresponds to the card image buffer area 401 of FIG. 4, and a field definition information storing circuit 1002 corresponds to the field definition information table 402 of FIG. 4. The field definition information storing circuit 1002 includes three registers for each field, i.e., a start address register 1003, a row number register 1004, and a column number register 1005 which are preset by a control means (not shown). Reference numeral 1006 designates a cursor control circuit including a cursor register 1007, which corresponds to the cursor location area 415 of FIG. 4.

Reference numeral 1008 designates a character retiring circuit triggered by pushing an insertion key. The character retiring circuit 1008 includes a field end address detecting circuit 1009, an insertion start address detecting circuit 1010, a retire start address detecting circuit 1011, a character transmitting circuit 1012, a retire destination end address detecting circuit 1013 and an insertion mark writing circuiyt 1014.

Reference numeral 1015 designates a character inserting circuit triggered by a character key. Reference numeral 1016 designates a space filling circuit triggered by an execution key. This space filling circuit 1016 includes a filling start address circuit 1017, a retired character transmitting circuit 1018 and a mark clearing circuit 1019.

In addition, various registers are provided. That is, a field end address register 1020, an insertion start address register 1021, a retire start address register 1022, a retire destination end address register 1023 and a filling start address register 1024 are provided.

When a key on the keyboard 304 is pushed, the keyboard control circuit 305 searches the code information of the pushed key. Accordingly, the keyboard control circuit 305 calls the cursor control circuit 1006, the character retiring circuit 1008, the character inserting circuit 1015, or the space filling circuit 1016 in accordance with the pushed key. For example, if the cursor key is pushed, the cursor control circuit 1006 is operated. If the insertion key is pushed, the character retiring circuit 1008 is operated. If one of the character keys is pushed, the character inserting circuit 1015 is operated. If the execution key is pushed, the space filling circuit 1016 is operated.

The cursor control circuit 1006 stores the position of the cursor into the cursor register 1007, thereby controlling the cursor. In the usual writing mode for a field, the cursor moves to the right within the field. When the cursor reaches the boundary on the right side of the field, the cursor moves to the boundary of a next row on the left side of the field. Contrary to this, in the case where the cursor is moved by pushing the cursor key, the cursor can move inside and outside of the field.

When the insertion key is depressed, the character retiring circuit 1008 retires the series of characters positioned on the after the cursor to the end portion within the field of the card image buffer 1001. In more detail, the field end address detecting circuit 1009 detects a field end address in accordance with the field definition information, i.e., the start address, the number of rows and the number of columns stored in the registers 1003, 1004 and 1005. The detected field end address is stored in the field end address register 1020. The insertion start address detecting circuit 1010 detects an insertion start address which is, in this case, the address of the cursor stored in the cursor register 1007. Then, the detected insertion start address is stored in the insertion start address register 1021. The retire start address detecting circuit 1011 detects a retire start address at which the last character in the series of displayed characters is positioned. Then the detected retire start address is stored in the retire start address register 1022. The character transmitting circuit 1012 transmits or translates the series of characters located from the insertion start address through the retire start address of the card image buffer 1001 to the end portion of the field of the card image buffer 1001. This end portion is defined by a retire destination start address which is the same as the field end address and a retire destination end address. Also, the retire destination end address is detected by the retire destination end adress detecting circuit 1013 and is then stored in the retire destination end address register 1023. The insertion mark writing circuit 1014 writes insertion marks such as "." into the locations between the retire destination end address and the retire start address of the card imare buffer 1001.

When a character key is depressed, the character inserting circuit 1015 writes code information corresponding to the depressed character key into a location of the card image buffer in which the cursor is positioned. Then, the character corresponding to the code information is displayed on the display picture. After writing, the cursor is also moved to the next position. If a "hireagana"-to-"kanji" transformation is necessary, a "kanji" dictionary stored in the floppy disks is referred to. After the insertion of characters, when the execution key is depressed, the space filling circuit 1016 fills the spaces after the inserted characters with the retired series of characters. In more detail, the filling start address detecting circuit 1017 detects a filling start address of the inserted characters. The retired character transmitting circuit 1018 transmits the retired characters to the locations on and after the filling start address. Then, the mark clearing circuit 1019 clears the insertion marks located at the insertion start address through the retire destination end address of the card buffer.

As explained above, according to the present invention, it is possible to keep the displayed characters from being shifted on every character insertion, thus facilitating viewing of the display picture. Further, the layout of inserted characters can be easily and rapidly obtained. At the same time, the insertion operation of characters within a field defined area can be easily carried out with proper attention paid to the subsequent character series and space. As a result, the insertion of a long character series will not cause following characters to overflow the end portion of the field.

We claim:

1. A word processing system for inputting and writing characters among displayed characters within a field, comprising:

keyboard means for keying, having at least character keys, a cursor moving key, an insertion key and an execution key;

display means for displaying characters and a cursor having a position;

cursor control means, connected to said keyboard means and said display means, for controlling the position of the cursor displayed on said display means in dependence upon depressions of said cursor moveing key;

a card image buffer, connected to said display means and said cursor control means, for storing code information in at least one field, the at least one field having a one-to-one correspondence with the displayed characters displayed on said display means;

field definition means, connected to said cursor control means, for storing field definition information for the at least one field in said card image buffer;

character retiring means, connected to said keyboard means, said display means, said cursor control means, said card image buffer and said field definition means, for moving a series of the displayed characters positioned on and after the cursor to an end portion of the field in said card image buffer when the insertion key is depressed;

character inserting means, connected to said keyboard means, said display means, and cursor control means, said card image buffer, said field definition means and said character retiring means, for sequentially inputting and writing the additional characters at the position of the cursor and moving the cursor in response to depressions of the character and cursor moving keys, the cursor moving into the end portion to write the additional characters in place of any portion of the series of displayed characters in response to appropriate depressions of the character and cursor moving keys; and space filling means, connected to said keyboard means, said card image buffer, said field definition means and said character retiring means, for filling any remaining spaces after the additional characters with the series of displayed characters, when the execution key is depressed.

2. A system as set forth in claim 1, wherein said character retiring means comprises:

means, connected to said card image buffer and said field definition means, for detecting a field end address of he field in said card image buffer in dependence upon the field definition information stored in said field definition means;

means, connected to said cursor control means and said card image buffer, for detecting an insertion start address of said card image buffer at which the cursor is position;

means, connected to said card image buffer, for detecting a retire start address of said card image buffer at which a last character in the series of the displayed characters is stored;

means, connected to said card image buffer, for moving the series of the displayed characters, from the retire start address through the insertion start address of said card image buffer, to the end portion of the field of said card image buffer, the end portion being determined by a retire destination start address and a retire desitnaiton end address, the retire destination start address being the field end address;

means, connected to said card image buffer, for detecting the retire destination end address of the end portion of said card image buffer; and means, connected to said card image buffer, for writting insertion marks between the retire destination end address and the insertion start address of said card imare buffer.

3. A system as set forth in claim 2, wherein said character inserting means comprises:

character key sensing means, connected to said keyboard means, for detecting whether or not a selected character key is depressed;

code writing means, connected to said keyboard means, said card image buffer, said cursor control means and said character sensing means, for writing code information corresponding to the selected character key into a character location of said card image buffer at which the cursor is positioned, when the selected character key is pushed;

character displaying means, connected to said display means, said cursor control means and said code writing means, for displaying a character corresponding to the code information on said display means; and means, connected to said display means, said cursor control means and said character displaying means, for moving the cursor to a next location on said display means immediately following the character location.

4. A system as set forth in claim 1, wherein said space filling means comprises:

filling start means, connected to said keyboard means and said card image buffer, the detecting a filling start address following the additional characters in said card image buffer;

means, connected to said card image buffer, said character retiring means and said filling start means, for moving the series of the displayed characters to a series of locations within begin with the filling start address; and means, connected to said card image buffer and said character retiring means, for clearing any of the insertion marks remaining between the insertion start address and the retire destination end address of said card image buffer.

5. A system as set forth in claim 3, wherein said code information writing means, comprises:

replacement means for replacing the insertion mark at the character location of said card image buffer at which the cursor is positioned with the code information corresponding to the selected character key, when the selected character key is a non-blank key; and clearing means for clearing the insertion mark at the character location of said card image buffer at which the cursor is positioned, when the selected character key is a space key.

6. A method for inserting additional characters among displayed characters within a field having an end, in a word processing system having a display unit, said method comprising the steps of:

(a) indicating that an insertion process is to start at an insertion start address;

(b) moving a retired series of characters to the end of the field and displaying the displayed characters with the retired series of characters moved to the end of the field, step (b) comprising the steps of:

(bi) determining a field end address;

(bii) determining the insertion start address;

(bii) scanning display locations from the field end address to the insertion start address to determine whether the display locations scanned include retired characters and ending the insertion process if the retired characters are not found in the display locations scanned;

(biv) moving the retired characters from the insertion start address through the retire start address to a retire destination end address through the field end address;

(bv) writing non-blank insertion marks into the display locations from the insertion start address to a display location immediately preceding the retire detination address; and (bvi) displaying the displayed characters including the non-blank insertion marks after steps (bi) through (bv) have been completed;

(c) inputting and writting characters on the display unit starting at the insertion start address and ending at a filling start address which may be within the retained series of characters; and (d) moving the retired series of characters from the end of the field to the filling start address when the filling start address is outside of the retired series of characters.

* * * * *

UNITED STATES PATENT AND TRADEMARK OFFICE
CERTIFICATE OF CORRECTION

PATENT NO. : 4,663,731

DATED : May 5, 1987

INVENTOR(S) : Ikegami et al.

It is certified that error appears in the above-identified patent and that said Letters Patent is hereby corrected as shown below:

Col. 1, line 25, "(syn-" should be --(sym- --;

Col. 2, line 9, "remaind" should be --remained--;
line 16, "picture" should be --pictures--;
line 17, "use" should be --used--;
line 45, after "indicating" insert --the--.

Col. 3, line 33, "benind" should be --behind--;
line 46, "displayunit" should be --display unit--;
line 66, "content" should be --contents--.

Col. 6, line 10, after "directly" insert --to--;
line 38, "soure" should be --source--.

UNITED STATES PATENT AND TRADEMARK OFFICE
CERTIFICATE OF CORRECTION

PATENT NO. : 4,663,731

DATED : May 5, 1987

INVENTOR(S) : Ikegami et al.

It is certified that error appears in the above-identified patent and that said Letters Patent is hereby corrected as shown below:

Col. 7, line 23, "circuiyt" should be --circuit--;
line 60, "the" (first occurrence) should be --and--.

Col. 8, line 17, "adress" should be --address--;
line 31, ""hireagana"" should be --"hiragana"--;
line 68, "moveing" should be --moving--;

Col. 9, line 57, "desitnaiton" should be --destination--;
line 66, "imare" should be --image--.

Col. 10, line 24, "the" should be --for--;
line 30, "within" should be --which--.

Col. 8, line 22, "imare" should read -- image --.

Signed and Sealed this

Twenty-second Day of December, 1987

Attest:

DONALD J. QUIGG

Attesting Officer

Commissioner of Patents and Trademarks